United States Patent
Neefe

[11] 3,760,807
[45] Sept. 25, 1973

[54] METHOD OF RESHAPING THE CORNEA TO ELIMINATE REFRACTIVE ERRORS

[76] Inventor: Charles W. Neefe, Box 429, Big Spring, Tex. 79720

[22] Filed: Apr. 7, 1972

[21] Appl. No.: 241,904

Related U.S. Application Data

[63] Continuation-in-part of Ser. No. 45,333, June 11, 1970, abandoned, which is a continuation-in-part of Ser. No. 562,022, May 16, 1966, abandoned.

[52] U.S. Cl. ................. 128/260, 128/249, 351/162
[51] Int. Cl. ............................................ A61m 31/00
[58] Field of Search ..................... 128/249, 260, 68; 351/162

[56] References Cited
UNITED STATES PATENTS

| | | | |
|---|---|---|---|
| 3,710,796 | 1/1973 | Neefe | 128/260 |
| 3,710,795 | 1/1923 | Higuchi et al. | 128/260 |
| 3,664,340 | 5/1972 | Morgan | 128/249 |
| 2,241,415 | 5/1941 | Moulton | 351/162 |

OTHER PUBLICATIONS

"Contact Lens Theory & Practice" by T. P. Grosvenor, Professional Press Inc. 1963, Special Uses of Contact Lenses Page 344, Scientific Library RE 977C6G7C2

Primary Examiner—Aldrich F. Medbery
Attorney—D. Carl Richards et al.

[57] ABSTRACT

A method of correcting refractive errors of the eye by changing the shape of the central segment of the cornea by softening the corneal tissue with drugs and reshaping the cornea to the surface of a concave mold.

12 Claims, 1 Drawing Figure

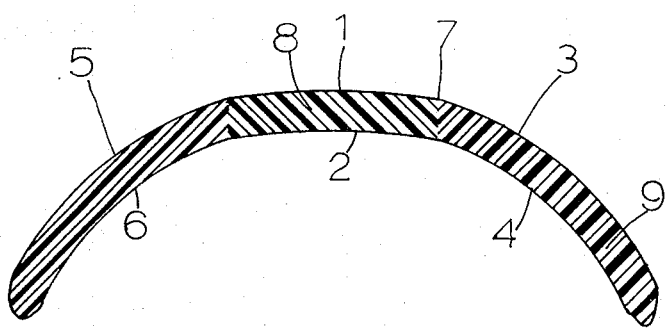

METHOD OF RESHAPING THE CORNEA TO ELIMINATE REFRACTIVE ERRORS

This is a continuation-in-part of application Ser. No. 45,333 filed June 11, 1970, entitled "A Dimensionally Stable Permeable Contact Lens" which is a continuation-in-part of an earlier application Ser. No. 562,022 filed May 16, 1966 and now all abandoned.

Refractive errors of the eye are corrected with spectacles by changing the angle at which the light enters the cornea by refracting the light with a lens before it reaches the cornea.

Contact lenses correct refractive errors of the eye by replacing the defective corneal curve with the front curve of the contact lens which is calculated to render the eye emmetropic.

This new method corrects refractive errors by reshaping a central segment of the cornea to the curvature required for emmetropia. This is accomplished by supplying drugs which soften the cornea such as proparacaine hydrochloride, dyclonine hydrochloride, diethylominoacet-2, 6-xylidide hydrochloride, chlorine, or proteolytic enzymes to the cornea. The drugs may be supplied from the periphery of the lens to the lacrimal fluid by being dissolved from the lens or instilled by drops in the eye. The chemically softened cornea is reshaped by being molded to the concave surface of a plastic mold having a predetermined curvature at the center. The mold radius is selected to render the eye emmetropic and contact lenses or eye glasses will not be required for good visual acuity after removing the concave mold from the cornea.

The FIGURE is a cross section of a mold of the device taken along a central line.

The central curvature of the concave mold (2 FIG. 1) may be made aspheric with a longer radius towards the periphery as described in my earlier U.S. Nos. 3,510,207 and No. 3,641,717 describing the use of aspheric surfaces to correct the eye for spherical aberration. This added correction at the corneal surface will yield sharper images having better contrast than is possible with spherical surfaces. The reshaped cornea having an aspheric surface corrected for spherical aberration will have better optical quality than is possible in the natural eye.

The following are examples of some of the drugs which may be used to soften the cornea.

Proparacaine hydrochloride is an anesthetic and is known to soften the corneal tissues. The fact that it is an anesthetic is helpful in that the curvature changing may take place without discomfort to the patient.

Chlorine in solution and in small quantities also softens the corneal tissue and may produce edema. Chlorine must be present in very small amounts to prevent excessive edema.

Proteolytic enzymes soften the stroma and allow the corneal structure to assume the desired shape.

The corneal mold may be constructed of a gas permeable plastic material such as silicone carbonate copolymer, cis-polybutadine, poly (4-methyl pentene), fluoroalkylethyl acrylates, or diacetone acrylamide. The central segment (8 FIG. 1) may be transparent and has an inner curvature (2 FIG. 1) which is calculated to make the eye emmetropic when the cornea is molded to this curvature. The front curvature (1 FIG. 1) is of a radius such that a plano or zero refractive power is present. The peripheral segment (9 FIG. 1) has an inner radius (6 and 4 FIG. 1) equal to the periphery of the cornea to which it is applied. The convex surface of the periphery (5 and 3 FIG. 1) may be concentric to the concave surface. The gas permeability provides oxygen to the cornea and aids in removing carbon dioxide while the mold is in place.

Water absorbing hydrophilic materials may also be used to form the mold. The hydrophilic material must be firm and dimensionally stable. The periphery may be used to deliver the drugs to the cornea.

The central segment (8 FIG. 1) may be transparent to allow vision while the mold is in place. The release rate of the drugs in the periphery (9 FIG. 1) must be controlled.

The most effective and useful method of controlling release rate in contact lenses has been the use of a parsimonious particle containing the drug within the particle and the drug containing particles are dispursed within a matrix of drug transporting material. The parsimonious polymer has a low water content and may be as follows: diacetone acrylamide 10 to 50 percent, methyl methacrylate 10 to 40 percent, ethyleneglycol monomethacrylate 20 to 40 percent, cross-linking agents such as allyl methacrylate and ethylene dimethacrylate may be used from 0.1 to 5 percent to slow the release rate further. An increase in the amount of diacetone acrylamide also slows the release rate from the particle. Increasing the amount of ethyleneglycol monomethacrylate will increase the rate of drug release from the particle. An example of a drug transporting material follows ethyleneglycol monomethacrylate cross-linked with 0.2 percent ethyleneglycol dimethacrylate when polymerized and hydrated water soluble drugs may migrate freely through the material.

The interocular pressure is 16 to 22 millimeters of mercury in the normal eye. This internal pressure forces the chemically softened cornea against the inner surface of the concave mold and holds the corneal tissue in the desired shape. Without the mold in place to hold and shape the cornea the above medication may be capable of precipitating keratoconus for the proteolytic enzymes are known to be a causative agent of keratoconus. The mold is kept in place after the medication is removed and Vitamin C may be administered orally. The presence of Vitamin C speeds the hardening of the cornea once the softening medication has been discontinued. When the cornea has returned to its normal firm condition, the mold may be removed and the eye will be emmetropic.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description or shown in the accompanying drawings shall be interpreted as illustrative and not in a limiting sense.

I claim:

1. A method of making the eye emmetropic comprising the steps of applying selected non-permanent cornea softening medical chemical compounds to the cornea, providing a concave mold having a preselected central segment radius said concave central radius being equal to the convex radius required on the cornea to render the eye emmetropic and a peripheral curvature substantially equal to the peripheral corneal curvature applying said mold to said cornea, molding the softened cornea to convex curvatures equal to the concave curvatures present on the concave mold and the preselected central curvature molded on the cornea being the curvature required to make the eye emmetropic, keeping the mold in place on the cornea until the medical compound is not active and the cornea has hardened, and removing the mold from the cornea.

2. A method as in claim 1 wherein the said selected chemical compounds are contained within said peripheral segment of the concave mold and the release rate from the lens to the eye is controlled.

3. A method as in claim 1 wherein said mold is provided with a central segment of transparent material.

4. A method as in claim 1 wherein said central segment has a plano or zero refractive power.

5. A method as in claim 1 wherein said concave central mold segment has an aspheric surface which when molded on the convex corneal surface will correct the eye for spherical aberration.

6. A method as in claim 3 wherein said transparent central segment is made having a preselected concave radius and a peripheral radius substantially the same as the peripheral corneal radius.

7. A method as in claim 1 wherein the selected chemical compound is proparacaine hydrochloride.

8. A method as in claim 1 wherein the selected chemical compound is chlorine of a quantity that does not produce excessive edema.

9. A method as in claim 1 wherein the selected chemical is a proteolytic enzyme.

10. A method as in claim 1 wherein the concave mold material is permeable to oxygen.

11. A method as in claim 1 wherein the concave mold material is hydrophilic.

12. A method as in claim 1 wherein the hardening of the cornea is accelerated by administring vitamin C.

* * * * *

UNITED STATES PATENT OFFICE
CERTIFICATE OF CORRECTION

Patent No. 3,760,807  Dated September 25, 1973

Inventor(s) Charles W. Neefe

It is certified that error appears in the above-identified patent and that said Letters Patent are hereby corrected as shown below:

Col. 3, line 10, immediately following the phrase "is not active and the cornea has" change "hardered" to --hardened--.

Signed and sealed this 1st day of January 1974.

(SEAL)
Attest:

EDWARD M. FLETCHER, JR.
Attesting Officer

RENE D. TEGTMEYER
Acting Commissioner of Patents